United States Patent
Baskaran et al.

(10) Patent No.: US 12,066,833 B2
(45) Date of Patent: *Aug. 20, 2024

(54) COMPUTER-ASSISTED OR AUTONOMOUS DRIVING ASSISTED BY ROADWAY NAVIGATION BROADCAST

(71) Applicant: Intel Corporation, Santa Clara, CA (US)

(72) Inventors: Rajashree Baskaran, Seattle, WA (US); Maruti Gupta Hyde, Portland, OR (US); Min Suet Lim, Penang (MY); Van Le, Beaverton, OR (US); Hebatallah Saadeldeen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/322,056

(22) Filed: May 17, 2021

(65) Prior Publication Data

US 2021/0302997 A1     Sep. 30, 2021

Related U.S. Application Data

(63) Continuation of application No. 16/143,355, filed on Sep. 26, 2018, now Pat. No. 11,009,890.

(51) Int. Cl.
*G05D 1/00*     (2024.01)
*B60W 30/00*    (2006.01)
(Continued)

(52) U.S. Cl.
CPC ........... *G05D 1/0276* (2013.01); *B60W 30/00* (2013.01); *G05D 1/0231* (2013.01);
(Continued)

(58) Field of Classification Search
None
See application file for complete search history.

(56) References Cited

U.S. PATENT DOCUMENTS

| | | | |
|---|---|---|---|
| 8,340,893 B2 | 12/2012 | Yamaguchi et al. | |
| 8,902,080 B2 | 12/2014 | Sugawara et al. | |
| (Continued) | | | |

FOREIGN PATENT DOCUMENTS

WO     WO2020057105 A1     3/2020

OTHER PUBLICATIONS

Office Action mailed Jun. 23, 2020 for U.S. Appl. No. 16/143,355, 14 pages.
(Continued)

*Primary Examiner* — Abdhesh K Jha
(74) *Attorney, Agent, or Firm* — Schwegman Lundberg & Woessner, P.A.

(57) ABSTRACT

The present disclosure may be directed to a computer-assisted or autonomous driving (CA/AD) vehicle that receives a plurality of indications of a condition of one or more features of a plurality of locations of a roadway, respectively, encoded in a plurality of navigation signals broadcast by a plurality of transmitters as the CA/AD vehicle drives past the locations enroute to a destination. The CA/AD vehicle may then determine, based in part on the received indications, driving adjustments to be made and send indications of the driving adjustments to a driving control unit of the CA/AD vehicle.

15 Claims, 10 Drawing Sheets

(51) Int. Cl.
    *G08G 1/01*           (2006.01)
    *H04W 4/029*       (2018.01)
    *H04W 4/38*         (2018.01)
    *H04W 4/44*         (2018.01)

(52) U.S. Cl.
    CPC .......... *G08G 1/0116* (2013.01); *H04W 4/029* (2018.02); *H04W 4/38* (2018.02); *H04W 4/44* (2018.02)

(56) References Cited

U.S. PATENT DOCUMENTS

| | | |
|---|---|---|
| 9,008,961 B2 | 4/2015 | Nemec et al. |
| 10,203,699 B1 * | 2/2019 | Kim ........................ H04L 67/12 |
| 10,466,716 B1 * | 11/2019 | Su ........................ G05D 1/0285 |
| 11,705,005 B2 * | 7/2023 | Tao ........................ G08G 1/164 |
| | | 701/301 |
| 2017/0225567 A1 | 8/2017 | Tsuda |
| 2018/0178781 A1 | 6/2018 | Funk et al. |
| 2019/0028862 A1 * | 1/2019 | Futaki .................... H04W 4/44 |
| 2019/0041850 A1 | 2/2019 | Chase et al. |
| 2019/0049993 A1 | 2/2019 | Baskaran et al. |
| 2019/0094865 A1 | 3/2019 | Fletcher |
| 2019/0193737 A1 | 6/2019 | Likhachev et al. |
| 2021/0001889 A1 * | 1/2021 | Furukawa ............. B60W 40/12 |

OTHER PUBLICATIONS

Final Office Action mailed Nov. 11, 2020 for U.S. Appl. No. 16/143,355, 19 pages.

\* cited by examiner

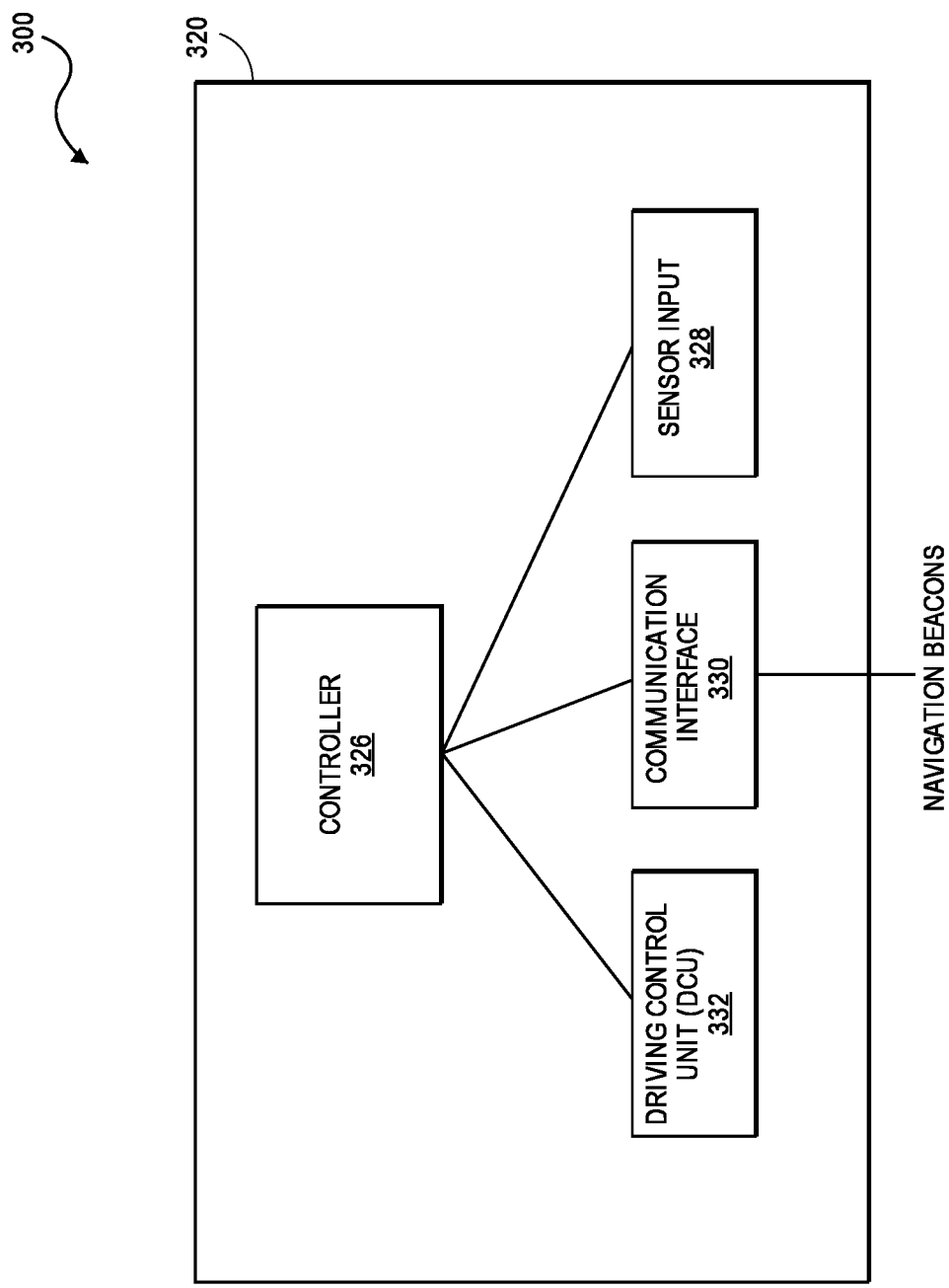

NON-TRANSITORY COMPUTER-READABLE STORAGE MEDIUM
1002

PROGRAMMING INSTRUCTIONS 1004

CONFIGURED TO CAUSE A DEVICE, IN RESPONSE TO EXECUTION OF THE PROGRAMMING INSTRUCTIONS, TO PRACTICE (ASPECTS OF) EMBODIMENTS OF THE PROCESS(ES) OF FIGURES 1-9.

FIG. 10

COMPUTER-ASSISTED OR AUTONOMOUS DRIVING ASSISTED BY ROADWAY NAVIGATION BROADCAST

CROSS REFERENCE TO RELATED APPLICATIONS

The present application is a continuation of U.S. application Ser. No. 16/143,355 filed Sep. 26, 2018, entitled "COMPUTER-ASSISTED OR AUTONOMOUS DRIVING ASSISTED BY ROADWAY NAVIGATION BROADCAST", the contents of which is hereby incorporated by reference in its entirety.

FIELD

Embodiments of the present disclosure generally relate to the field of computer-assisted or autonomous driving vehicles. More specifically, embodiments of the present disclosure relate to computer-assisted or autonomous driving (CA/AD) assisted by roadway navigation broadcast.

BACKGROUND

When CA/AD driven and people driven vehicles drive on the same roadway, especially in freeways or highways, there are co-existence, trust and safety issues. For example there may be differences in response times, speeds, rates of acceleration, situational awareness and alertness levels between the vehicles, which may cause accidents or other roadway incidents.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 illustrates a block diagram of a CA/AD vehicle that interacts with one or more roadway navigation broadcast, in accordance with various embodiments.

FIG. 10 illustrates a storage medium having instructions for practicing methods described with references to FIGS. 1-6, according to various embodiments.

DETAILED DESCRIPTION

Figure 1:
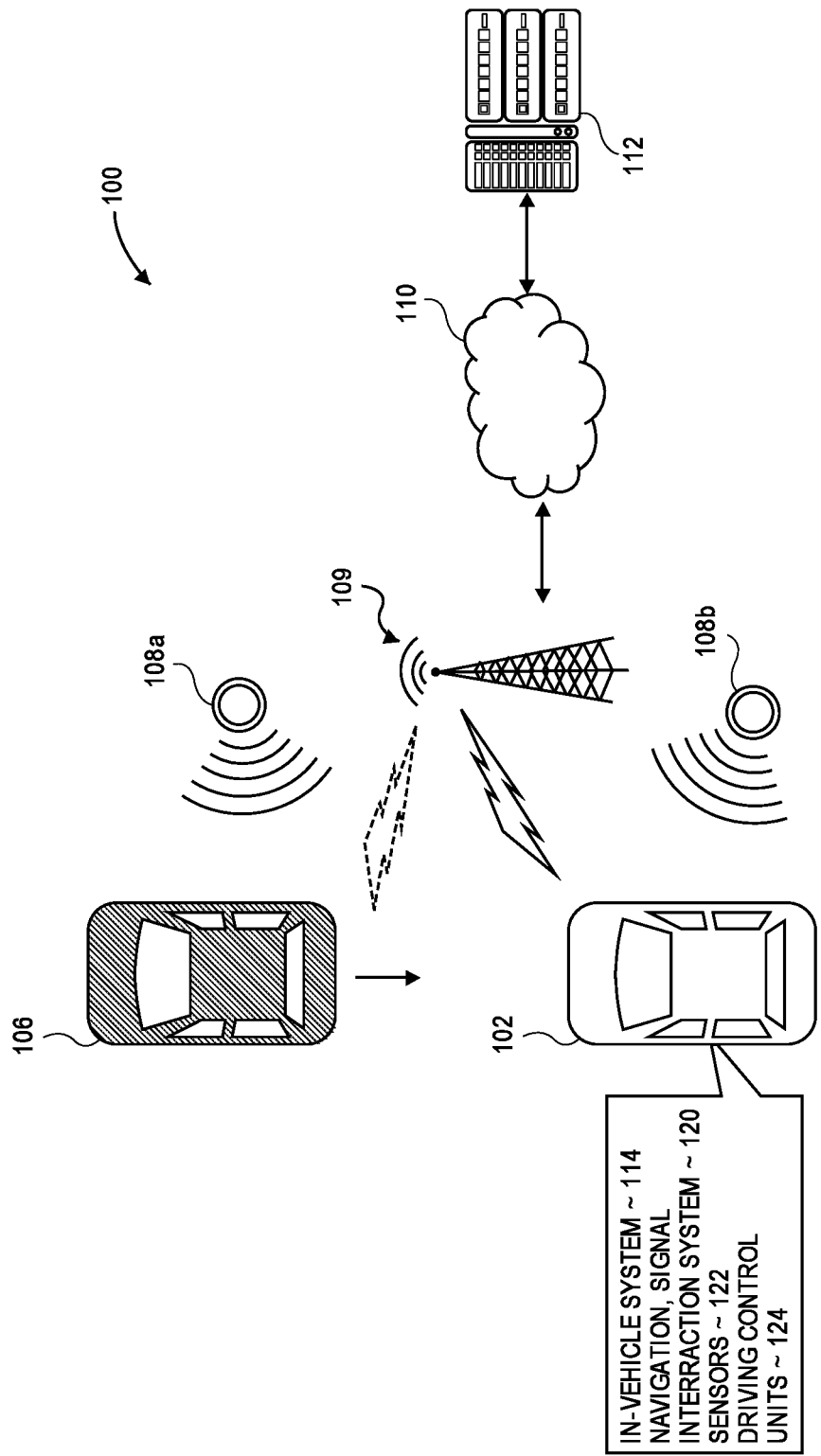
FIG. 1 illustrates an overview of an environment for CA/AD assisted by roadway navigation broadcast, in accordance with various embodiments.

Disclosures herein may be directed to navigation broadcast from various locations along roadways, on bridges, or in tunnels to assist CA/AD. For example, navigation signals may be broadcast regularly (or on demand, as a vehicle approaches) from devices placed between or on the outside of roadway lanes, on exit or entrance ramps, or on other features such as barriers or overpasses to identify fixed locations proximate to a roadway. These navigation broadcast devices may have sensors that may monitor traffic visually, through radar, through light detection and ranging (LiDAR) sensors, or through some other sensing technology, to collect traffic, weather, visibility data, and/or other data at the navigation broadcast devices' locations. In addition, navigation broadcasts may include information about features of the roadway. For example, they may identify the location of lane positions, road edges, exit ramps, entrance ramps, and the like. This information may then be sent to a CA/AD vehicle via the broadcast to determine driving adjustments to be made to the CA/AD vehicle, and to augment the CA/AD vehicle experience for passengers.

For example, in embodiments, navigation broadcast signals may be used to identify and/or isolate a lane in a roadway to be exclusively used by CA/AD vehicles. These lanes may be analogous to high-occupancy vehicle (HOV) lanes or paid fast lanes in legacy freeway infrastructures. In embodiments, lanes used exclusively by CA/AD vehicles may have physical and/or navigation broadcast device-based barriers to separate the exclusive lanes from other lanes. For example, when the targeted driving distance for a CA/AD vehicle along in a freeway is greater than a determined distance, the CA/AD vehicle may identify, via navigation broadcast signals, whether an exclusive CA/AD vehicle lane exists and if so, direct itself to this exclusive lane. Once in the exclusive lane, the vehicle may continue to use navigation broadcast signal information and infrastructure, as well as other inter-vehicle data, for an enhanced driving experience. For example, because the exclusive lane has only CA/AD vehicles, the predictability of driving characteristics for each vehicle in the lane may be greatly increased. Therefore, the distance between cars may be reduced and/or the overall speed of the cars may be increased within this exclusive lane.

In another example, CA/AD in-vehicle sensors may not be able to detect within a certain range, due to rain or fog that may reduce or otherwise impair the sensors' functionality. In addition, CA/AD in-vehicle sensor may not be able to rely on CA/AD transmission from other automated vehicles around them. This may be due to transmission issues because some of those vehicles may not be CA/AD capable and may be blocking or not otherwise relaying transmissions. Thus, in embodiments, when navigation broadcast signal-based road infrastructure is deployed, it can act as an additional information source CA/AD vehicles can rely upon and use for more precise situational awareness with respect to the roadway. Such infrastructure may reduce traffic accidents and/or other driving incidents along the roadway by tailoring driving adjustments, such as adjusting speed and adjusting for the sharpness of turns.

Navigation broadcast signal devices may include proximity or distance sensors using infra-red or ultra-some or short-range distance detection sensors and/or high-accuracy cameras. Because sensors are fixed in location and may be localized in terms of their own location very accurately, they can provide sensing information within centimeter (cm) accuracy. In addition, the relative range of the sensor, in terms of the distance over which it predicts, does not have to be very high as it is meant to be used over a certain fixed distance (e.g. within the exit ramp range unlike the sensors within vehicles which must be accurate over varied distances) to be useful for navigation. This allows new technologies or new types of sensing for automated vehicles.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices that cooperate and/or interact through one or more network linkages such as wired and/or wireless networks. By way of example and not limitation, a computing apparatus may include two or more computing devices "coupled" on a motherboard or by one or more network linkages.

The term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The term "computer-readable storage media" may refer to, be a part of, or otherwise include media on which data, including instructions of a module that may be executed, may reside. Computer-readable storage media may be either transitory or non-transitory.

As used herein, the term "semi-autonomous driving" is synonymous with computer-assisted driving. The term does not mean exactly 50% of the driving functions are automated. The percentage of driving functions automated may be a fraction of a percent to almost 100%.

Various operations are described as multiple discrete operations in turn, in a manner that is most helpful in understanding the claimed subject matter. However, the order of description should not be construed as to imply that these operations are necessarily order dependent.

FIG. 1 illustrates an overview of an environment for computer-assisted or autonomous driving assisted by roadway navigation broadcast, in accordance with various embodiments.

The example environment in diagram 100 includes a CA/AD vehicle 102 having an engine, transmission, axles, wheels and so forth. Further, vehicle 102 may include in-vehicle infotainment (IVI) system 114 having a number of infotainment subsystems/applications, e.g., instrument cluster subsystem/applications, front-seat infotainment subsystem/application, such as, a navigation subsystem/application, a media subsystem/application, a vehicle status subsystem/application and so forth, and a number of rear seat entertainment subsystems/applications. Further, IVI system 114 may be provided with a navigation signal interaction system/technology (NSIS) 120 of the present disclosure, to provide vehicle 102 with driving adjustments based at least in part on the signals received from the navigation broadcast devices 108a, 108b.

In embodiments, CA/AD vehicle 102 may receive signals from one or more roadway navigation broadcast devices 108a, 108b. It should also be appreciated that other vehicles 106 that may not be CA/AD equipped or enabled may be sharing the road with CA/AD vehicles 102. In embodiments described herein, the features and/or functions provided by the NSIS 120 may facilitate safety and efficiency of all vehicles traveling along a roadway, CA/AD vehicle 102 may include vehicle sensors 122 and driving control units 124. In some embodiments, vehicle sensors 122 are configured to provide various sensor data to the NSIS 120 to aid in determining driving adjustments to make to the CA/AD vehicle 102. In some embodiments, vehicle sensors 122 may include cameras, LiDAR sensors, external temperature sensors, microphones, accelerometers, gyroscopes, inertia measurement units (IMU), engine sensors, drive train sensors, tire pressure sensors, and so forth. Driving control unit (DCU) 124 may include electronic control units (ECUs) that control the operation of the engine, the transmission, the steering, and/or braking of CA/AD vehicle 102.

In some embodiments, IVI system 114, on its own or in response to the NSIS 120, may communicate or interact with one or more off-vehicle remote content servers 112, via a wireless signal repeater or base station on transmission tower 109 near CA/AD vehicle 102, and one or more private and/or public wired and/or wireless networks 110. Servers 112 may be servers associated with collecting information on traffic control and/or roadway conditions, navigation broadcast devices 108a, 108b, and CA/AD vehicles 102 for analysis and for providing data back to the CA/AD vehicle 102 that may cause driving adjustments to be made. Examples of private and/or public wired and/or wireless networks 110 may include the Internet, the network of a cellular service provider, and so forth. It is to be understood that transmission tower 109 may be different towers at different times/locations, as CA/AD vehicle 102 continues to travel.

In embodiments, navigation broadcast devices 108a, 108b may take any physical form in a fixed physical location. For example, navigation broadcast devices 108a, 108b may be located at or below a point in the surface of a roadway, may be elevated on a stand or pedestal, may be coupled with road side or a lane division barrier, or may be coupled to an overpass or some other structural feature proximate to the roadway, such as a Jersey barrier. These and other aspects of navigation broadcast devices 108a, 108b and NSIS 120 will be further described with references to the remaining Figures.

Figure 2B:
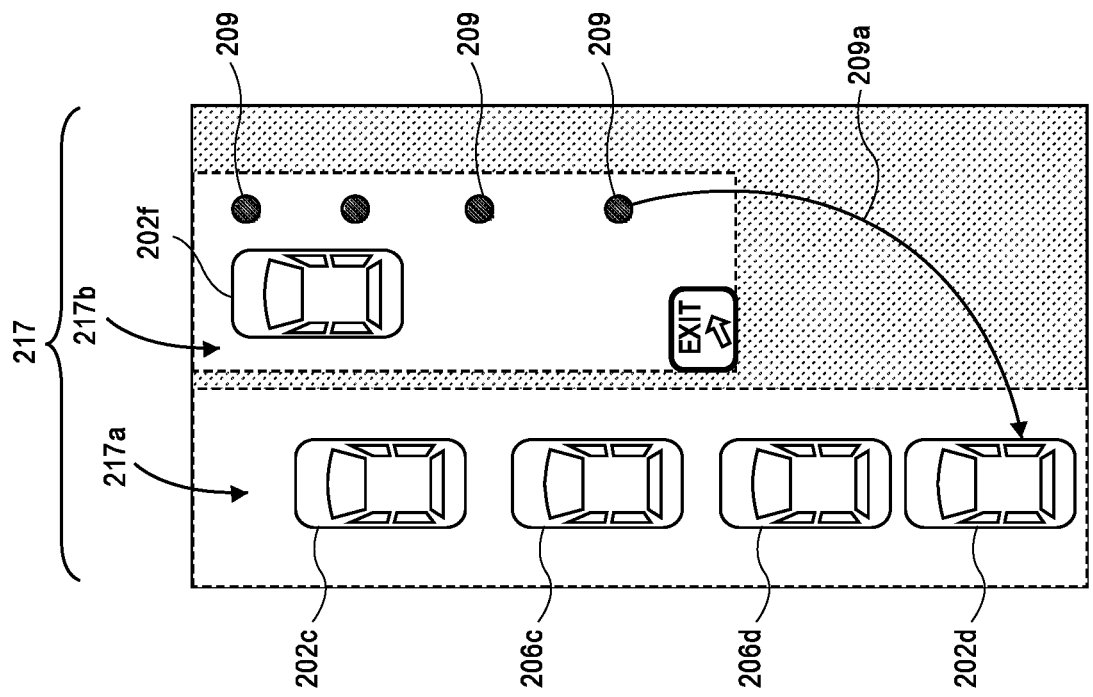
FIGS. 2A-2B illustrate block diagrams of example implementations of CA/AD vehicles interacting with roadway navigation broadcast, in accordance with various embodiments.
Figure 2A:
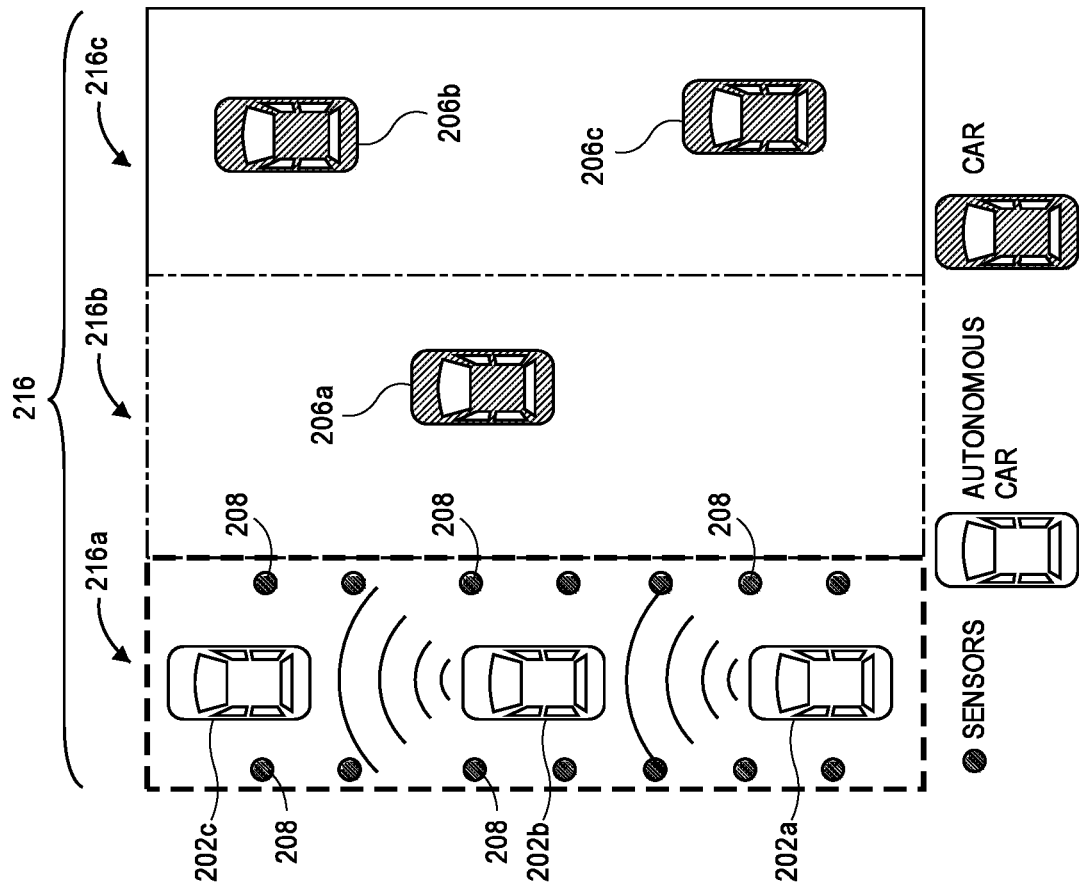

FIGS. 2A-2B illustrate block diagrams of example implementations of CA/AD vehicles interacting with roadway navigation broadcast, in accordance with various embodiments. FIG. 2A shows a block diagram of one example implementation of a roadway 216 that includes three lanes 216a, 216b, 216c in which multiple vehicles, including CA/AD vehicles 202a-202c, which may be similar to CA/AD vehicles 102 of FIG. 1, and non-CA/AD vehicles 206a-206c, which may be similar to vehicle 106 of FIG. 1, may drive.

In embodiments, one of the lanes 216a may be a lane designated as a CA/AD vehicle exclusive lane in the roadway 216. Sensors 208, which may be similar to sensors 108a, 108b, of FIG. 1, may be placed at regular intervals on either side of the lane 216a to identify it as an exclusive lane for CA/AD vehicles 202a-202c. In embodiments, the exclusive lane 216a may be identified as exclusive for a determined distance along lane 216a, or may be identified as exclusive depending upon various criteria, including but not limited to overall traffic flow on the roadway 216, the ratio of CA/AD vehicles to non-CA/AD vehicles on the roadway 216, traffic accidents or known construction roadway 216, or certain times of day and/or days of week.

In embodiments, the broadcast devices 208 may identify the existence and/or location of the CA/AD vehicle exclusive lane 216a in the roadway 216 by transmitting signals that include information to be received by the NSIS 120 of surrounding CA/AD vehicles 202a-202c. Based on criteria available to the IVI 114 or the NSIS 120, a CA/AD vehicle may initiate driving adjustments to either move into or to move out of the exclusive lane 216a. In one non-limiting example, if a CA/AD vehicle 202a is to drive more than a predetermined distance on roadway 216, then the CA/AD vehicle 202a may move into the exclusive lane 216a. If the CA/AD vehicle 202a is to exit the highway 216 and comes within a predetermined distance on roadway 216 away from the exit, then the CA/AD vehicle 202a may make driving adjustments exit the exclusive lane 216a.

In embodiments, the boundaries of the exclusive lane 216a may include markings and/or physical barriers on the roadway 216. Physical barriers may include raised portions of the roadway that, when driven over, emit a sound or cause a movement to the car to indicate the barrier has been crossed. Physical barriers may also include a Jersey barrier that may prevent movement by a vehicle between the exclusive lane 216a and the adjacent lane 216b along certain parts of the roadway 216.

Enabling CA/AD vehicles 202a-202c to use an exclusive lane 126a, may allow a safer, faster, and/or more efficient flow along roadway 216. For example, moving CA/AD vehicles 202a-202c to an exclusive lane 126a will allow them greater ability to communicate and/or share data by not having intervening non-CA/AD vehicles between them. As a result of greater communication and greater predictability, the distance between individual CA/AD vehicles 202a-202c may be decreased while their overall speed is increased.

In addition, in embodiments, the CA/AD vehicles 202a-202c may form a peloton of vehicles to increase efficiency and to reduce energy consumption. In embodiments, new protocols for hybrid driving (involving CA/AD vehicles and non-CA/AD vehicles) may be supported by this new infrastructure.

FIG. 2B shows a block diagram of one example of a roadway 217 that includes a lanes 217a and an exit ramp 217b in which multiple vehicles including CA/AD vehicles 202d, 202e, 202f may travel. Navigation broadcast device 209 may provide a signal 209a containing navigation information to the CA/AD vehicle 202d concerning an upcoming exit ramp 217b. If the route of the CA/AD vehicle 202d calls for it to take the exit, the CA/AD vehicle 202d may make appropriate driving adjustments well in advance, for example to move out of an exclusive lane 216a and toward the exit ramp 217b.

In embodiments, a navigation broadcast device 209, because it may be able to communicate its fixed position within centimeters, may provide the CA/AD vehicle 202d with a more precise location of the exit that may be achieved through other mechanisms such as GPS location. In embodiments, situations may arise where other CA/AD vehicle sensor data that ordinarily may be collected and used by the CA/AD vehicle 202d may not be available. For example, when CA/AD vehicle sensors are impaired or not functioning well due to rain or fog, or when the presence of non-CA/AD vehicles 206d, 206c may interfere with CA/AD vehicle sensors. In these situations, navigation broadcast device 209 signals providing alerts of upcoming exits may provide important supplemental information. In embodiments, receiving video images from navigation broadcast devices 209 may also be helpful to the CA/AD system and/or driver.

FIG. 3 illustrates a block diagram of a CA/AD vehicle that interacts with one or more roadway navigation broadcast, in accordance with various embodiments. Diagram 300 shows a NSIS 320, which may be similar to NSIS 120 of FIG. 1, associated with CA/AD vehicle such as CA/AD vehicle 102 of FIG. 1. In embodiments, all or part of the NSIS 320 may be included within the IVI 114, or may be outside of the IVI 114 of CA/AD vehicle 108a. In embodiments, the NSIS 320 may receive a plurality of indications of a condition of one or more features of a plurality of locations of roadway, determine adjustments to be made to a CA/AD vehicle, and then cause those driving adjustments to be implemented.

In embodiments, the NSIS 320 may include a communication interface 330 that receives information from signals transmitted from one or more navigation broadcast device 108*a*, 108*b* from FIG. 1 and communicates that information to the controller 326 for processing. In embodiments, the communication interface 330 may also receive transmissions from an antenna tower 109 or from some other transmission source that may provide additional information to the CA/AD vehicle 102.

A driving control unit (DCU) 332 may receive commands from the controller 326, that may represent driving adjustments, and then cause those driving adjustments to be implemented in the CA/AD vehicle 102.

Sensor input 328 may also be received from various sensors located within the CA/AD vehicle 102, as described above. This sensor input 328 may also be transmitted to the controller 326 for processing and/or determining driving adjustments to be made.

In embodiments, controller 326 may be implemented in hardware, software, or a combination thereof. Hardware implementations may include ASIC or programmable circuits. Software implementations may include a processor, memory and instructions embodied in the below described logic of the logic blocks in FIG. 4.

Example hardware implementations may include by are not limited to application specific integrated circuit (ASIC) or programmable circuits (such as Field Programmable Gate Arrays (FPGA)) programmed with the operational logic. Software implementations may include implementations in instructions of instruction set architectures (ISA) supported by the target processors, or any one of a number of high level programming languages that can be compiled into instruction of the ISA of the target processors. In some embodiments, especially those embodiments where controller 326 includes at least one neural network, at least a portion of controller 326 may be implemented in an accelerator. One example software architecture and an example hardware computing platform will be further described later with references to FIGS. 8-9.

Figure 7:
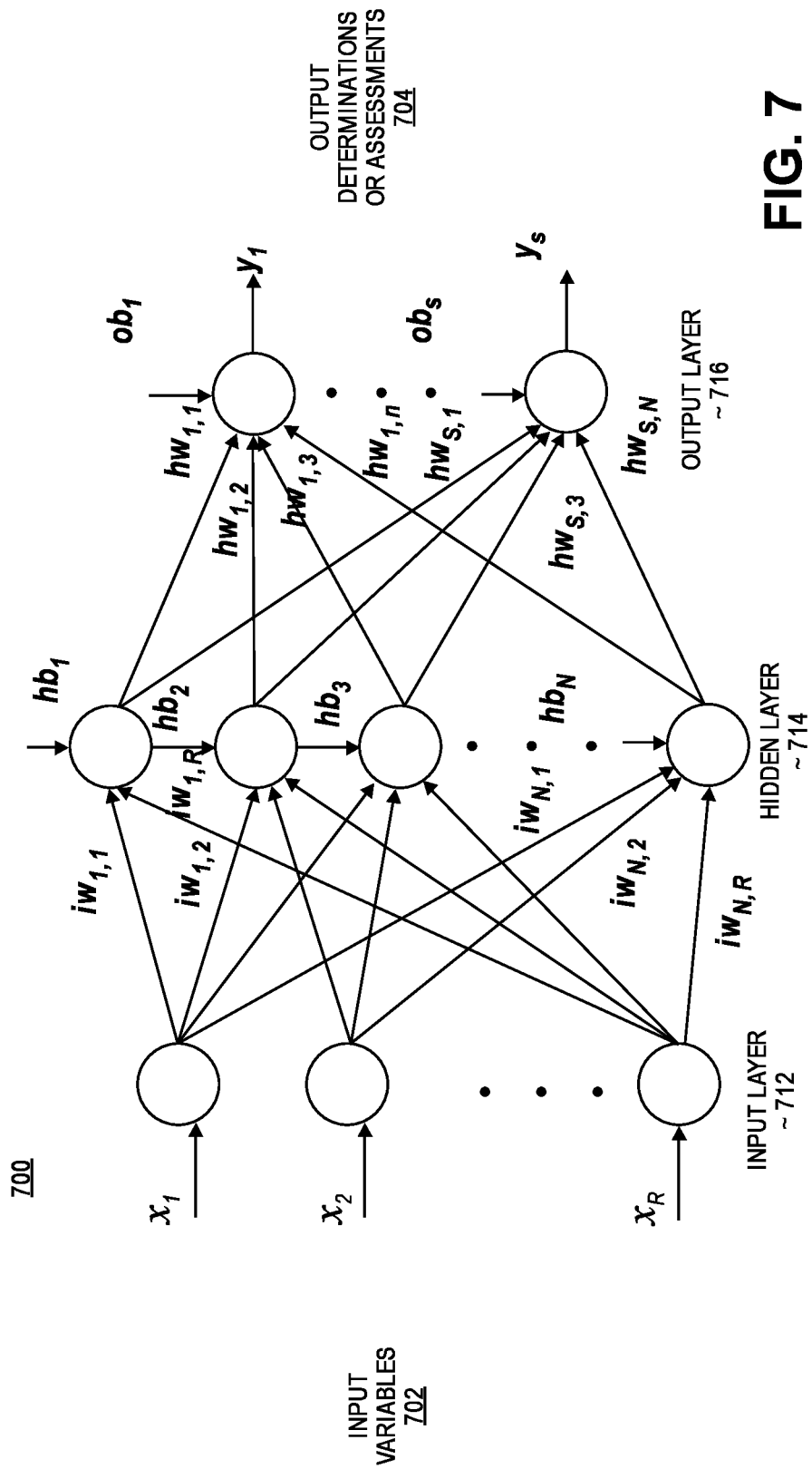
FIG. 7 illustrates an example neural network suitable for use with present disclosure, according to various embodiments.

In some embodiments, the controller 326 may include one or more trained neural networks in performing its determinations and/or assessments. FIG. 7 illustrates an example neural network suitable for use with present disclosure, according to various embodiments. As shown, example neural network 700 may be a multilayer feedforward neural network (FNN) comprising an input layer 712, one or more hidden layers 714 and an output layer 716. Input layer 712 receives data of input variables ($x_i$) 702. Hidden layer(s) 714 processes the inputs, and eventually, output layer 716 outputs the determinations or assessments ($y_i$) 704. In one example implementation the input variables ($x_i$) 702 of the neural network are set as a vector containing the relevant variable data, while the output determination or assessment ($y_i$) 704 of the neural network are also as a vector.

Multilayer feedforward neural network (FNN) may be expressed through the following equations:

$$ho_i = f\left(\sum_{j=1}^{R}(iw_{i,j}x_j) + hb_i\right), \text{ for } i = 1, \ldots, N$$

$$y_i = f\left(\sum_{k=1}^{N}(hw_{i,k}ho_k) + ob_i\right), \text{ for } i = 1, \ldots S$$

where $ho_i$ and $y_i$ are the hidden layer variables and the final outputs, respectively. f( ) is typically a non-linear function, such as the sigmoid function or rectified linear (ReLu) function that mimics the neurons of the human brain.

R is the number of inputs. N is the size of the hidden layer, or the number of neurons. S is the number of the outputs.

The goal of the FNN is to minimize an error function E between the network outputs and the desired targets, by adapting the network variables $i_w$, $h_w$, $h_b$, and $o_b$, via training, as follows:

$$E = \sum_{k=1}^{m}(E_k), \text{ where } E_k = \sum_{p=1}^{s}(t_{kp} - y_{kp})^2$$

where $y_{kp}$ and $t_{kp}$ are the predicted and the target values of $p^{th}$ output unit for sample k, respectively, and m is the number of samples.

In some embodiments, the controller 326 may include a pre-trained neural network 900 to determine how the vehicle may respond depending on signals received from navigation broadcast devices 108*a*, 108*b*. The input variables ($x_i$) 902 may include objects recognized from the information received from the navigation broadcast devices, and the readings of the various vehicles sensors, such as accelerometer, gyroscopes, IMU, and so forth. The output variables ($y_i$) 904 may include values indicating driving adjustments for the vehicle. The network variables of the hidden layer(s) for the neural network of controller 326 for determining vehicle adjustments, may be determined by the training data.

In the example of FIG. 7, for simplicity of illustration, there is only one hidden layer in the neural network. In some other embodiments, there can be many hidden layers. Furthermore, the neural network can be in some other types of topology, such as Convolution Neural Network (CNN), Recurrent Neural Network (RNN), and so forth.

Figure 4:
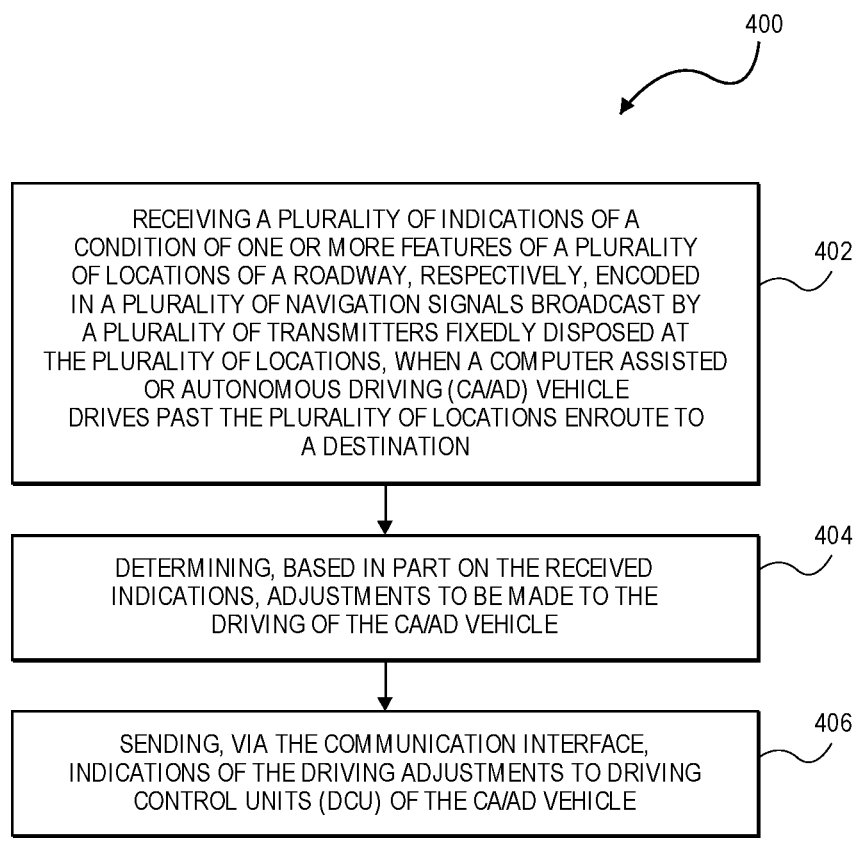
FIG. 4 illustrates an example process for assisting computer-assisted or autonomous driving with roadway navigation broadcast, in accordance with various embodiments.

FIG. 4 illustrates an example process for assisting computer-assisted or autonomous driving with roadway navigation broadcast, in accordance with various embodiments. Process 400 may be implemented using the features, components, or systems as described in FIGS. 1-3 and 5-10.

At block 302, the process may include receiving, via a communication interface, a plurality of indications of a condition of one or more features of a plurality of locations of a roadway, respectively, encoded in a plurality of navigation broadcast signals by a plurality of transmitters fixedly disposed at the plurality of locations, when the CA/AD vehicle drives pass the plurality of locations enroute to a destination. In embodiments, the plurality of navigation broadcast devices may correspond to navigation broadcast devices 108*a*, 108*b* of FIG. 1 that are fixedly disposed at a plurality of locations along a roadway. As described in FIGS. 2A, 2B, non-limiting examples of the placement of the navigation broadcast devices 208*a*, 209 may be to define an exclusive driving lane 216*a*, or an exit lane 217*b*.

At block 304, the process may include determining, based in part on the received indications, adjustments to be made to the driving of the CA/AD vehicle. In embodiments, the determination may be made in part with reference to the neural network as described in FIG. 7, which may take as input information derived from the received indications, and may produce as output driving adjustments to be made to the CA/AD vehicle 108*a*.

At block 306, the process may include sending, via the communication interface, indications of the driving adjustments to a DCU, as described above, of the CA/AD vehicle. In embodiments, the DCU may include one or more DCUs that are associated with control of the CA/AD vehicle.

Figure 5:
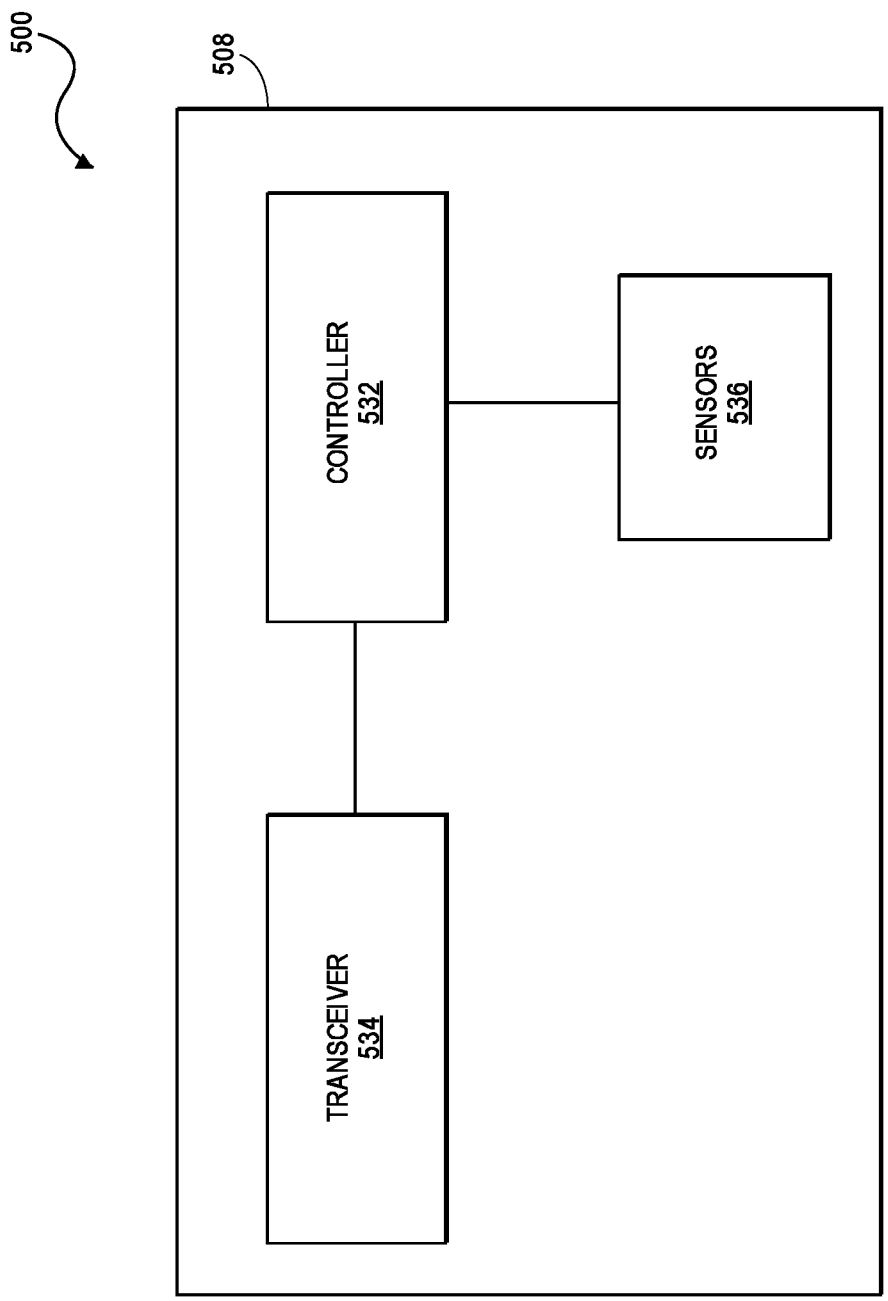
FIG. 5 illustrates a block diagram of a roadway navigation broadcasting apparatus, in accordance with various embodiments.

FIG. 5 illustrates a block diagram of a roadway navigation broadcasting apparatus, in accordance with various embodiments. Diagram 500 shows a navigation broadcast device 508 that may include a controller 532 that may be coupled with a transceiver 534 and/or sensors 536.

In embodiments, the transceiver 534 may broadcast signals that include information about the location of the navigation broadcast device 108a, properties of the navigation broadcast device, and other relevant information to a CA/AD vehicle 102. This information may then be sent to the controller 532 for further processing.

In addition, the transceiver 534 may receive signals, for example from server 112 via wired and/or wireless networks 110 and/or via transmission tower 109 that contain information to be used by the navigation broadcast device. Examples of this information may include control and configuration information such as activating or deactivating all or part of functions of the broadcast device 108a.

Sensors 536 may be included within the navigation broadcast device 508 to provide information to the controller 532 for processing transmission to one or more CA/AD vehicles 102. Sensors 536 may include cameras pointed in various directions that may identify conditions such as rain, snow, hail, haze, or fog. In embodiments, this information may be used to identify whether other CA/AD vehicles 102 may have difficulty communicating with each other due to the conditions, which may cause the controller 532 to adjust the repetition and/or the content of the information and broadcasts. In addition, camera information may be used to identify traffic density, which may be used by the navigation broadcast device 508 and/or the server 112 to modify navigation broadcast device 508 behavior. Sensors 536 may also include temperature sensors, infrared sensors, ultraviolet sensors, pressure sensors, and the like that may provide information about conditions proximate to the fixed location of the navigation broadcast device 508.

Figure 6:
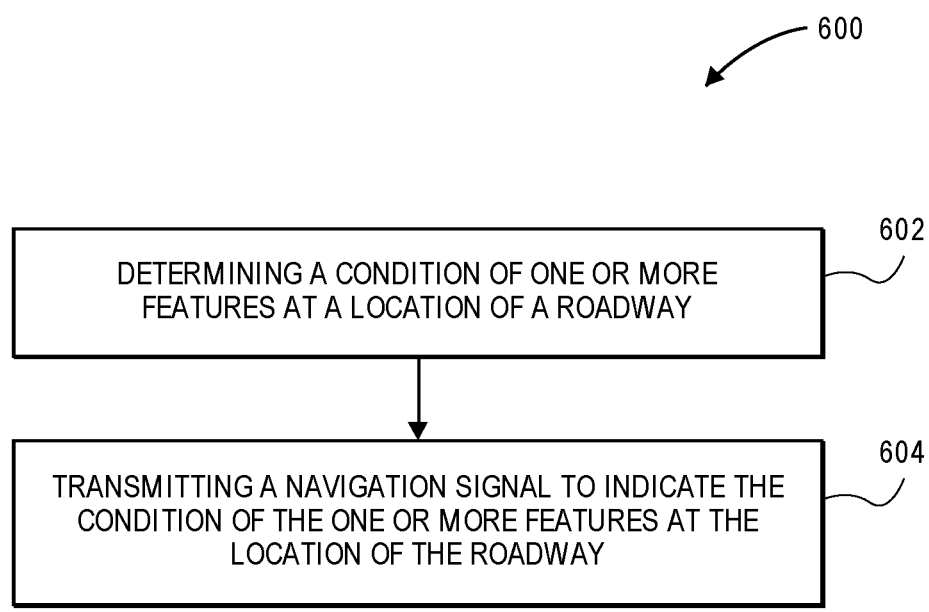
FIG. 6 illustrates an example process for implementing a roadway navigation broadcast, in accordance with various embodiments.

FIG. 6 illustrates an example process for implementing a roadway navigation broadcast, in accordance with various embodiments. Process 600 may be implemented using the features, components, or systems as described in FIGS. 1-2, 5, and 7-10.

At block 602, the process may include determining a condition of one or more features at a location of a roadway. The location may refer to the fixed location of the navigation broadcast device 108a proximate to the roadway 216. Conditions of one or more features at the location of the roadway may be as described above for FIG. 5. These may include ambient temperature, roadway wetness, humidity, roadway temperature, images of traffic volume, speed, or other characteristics at the location of the roadway.

At block 604, the process may include transmitting a navigation signal to indicate the condition of the one or more features at the location of the roadway. In embodiments, the transceiver 534 may be used to cause the transmission of the navigation signal.

Figure 8:
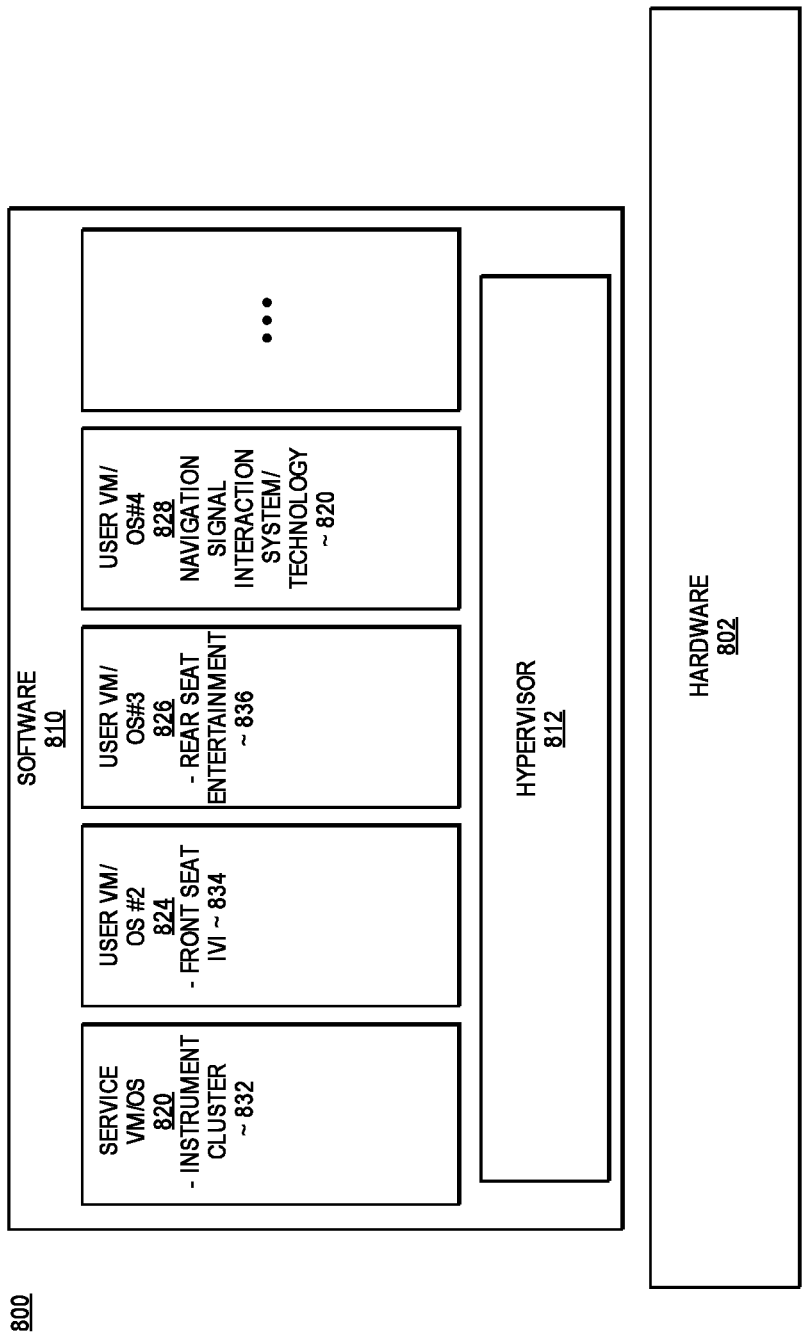
FIG. 8 illustrates a software component view of a CA/AD system in a CA/AD vehicle, according to various embodiments.

FIG. 8 illustrates a software component view of a CA/AD system in a CA/AD vehicle, according to various embodiments.

As shown, for the embodiments, system 800, which may include NSIS 120, includes hardware 802 and software 810. Software 810 includes hypervisor 812 hosting a number of virtual machines (VMs) 822-828. Hypervisor 812 is configured to host execution of VMs 822-828. The VMs 822-828 include a service VM 822 and a number of user VMs 824-828. Service machine 822 includes a service OS hosting execution of a number of instrument cluster applications 1032. User VMs 824-828 may include a first user VM 824 having a first user OS hosting execution of front seat infotainment applications 834, a second user VM 826 having a second user OS hosting execution of rear seat infotainment applications 836, a third user VM 828 having a third user OS hosting execution of a navigation signal interaction system, and so forth.

Except for navigation signal interaction system 120 of the present disclosure incorporated, elements 812-838 of software 810 may be any one of a number of these elements known in the art. For example, hypervisor 812 may be any one of a number of hypervisors known in the art, such as KVM, an open source hypervisor, Xen, available from Citrix Inc, of Fort Lauderdale, FL., or VMware, available from VMware Inc of Palo Alto, CA, and so forth. Similarly, service OS of service VM 822 and user OS of user VMs 824-828 may be any one of a number of OS known in the art, such as Linux, available e.g., from Red Hat Enterprise of Raleigh, NC, or Android, available from Google of Mountain View, CA.

Figure 9:
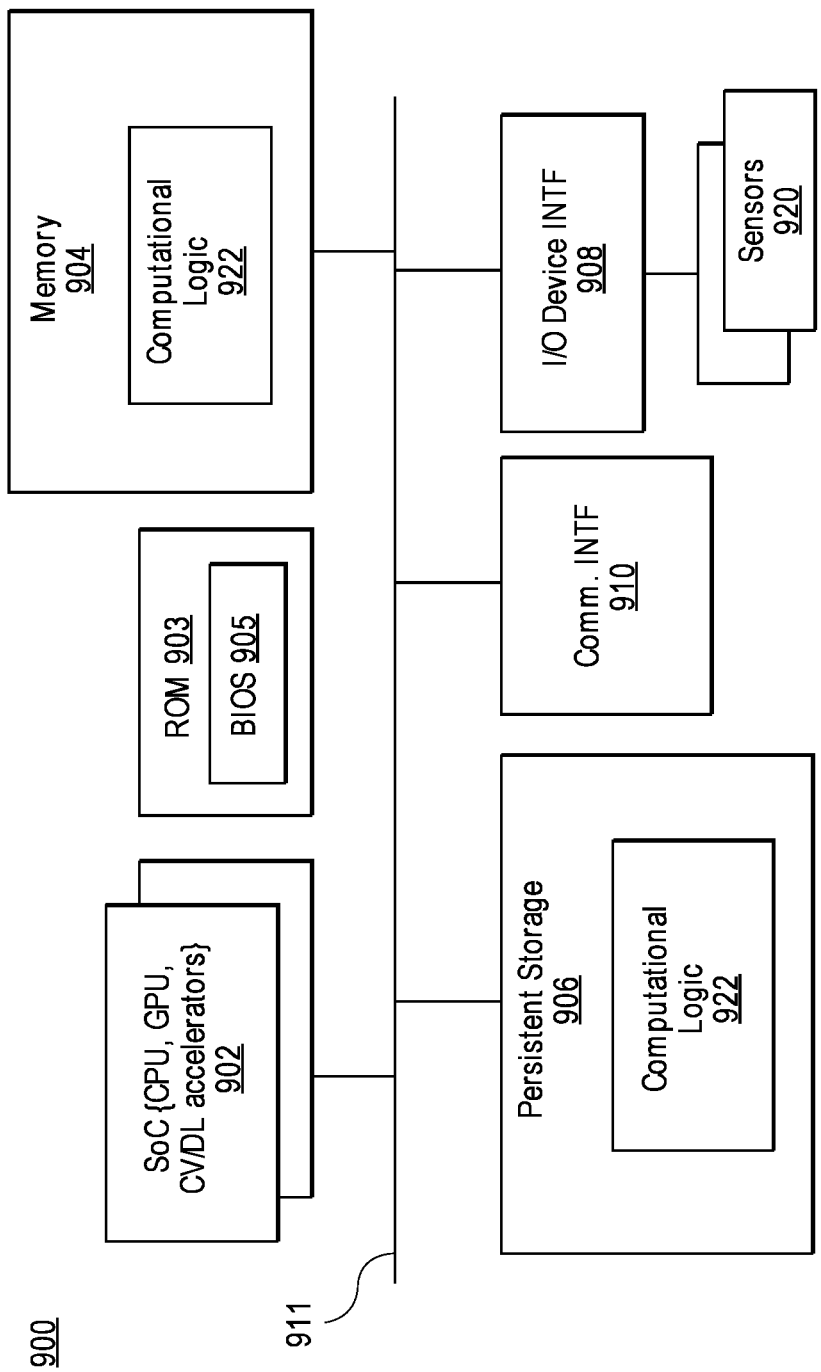
FIG. 9 illustrates a hardware component view of a CA/AD system in a CA/AD vehicle, according to various embodiments.

FIG. 9 illustrates a hardware component view of a CA/AD system in a CA/AD vehicle, according to various embodiments As shown, computing platform 900, which may be hardware 802 of FIG. 8, may include one or more system-on-chips (SoCs) 902, ROM 903 and system memory 904. Each SoCs 902 may include one or more processor cores (CPUs), one or more graphics processor units (GPUs), one or more accelerators, such as computer vision (CV) and/or deep learning (DL) accelerators. ROM 903 may include basic input/output system services (BIOS) 905. CPUs, GPUs, and CV/DL accelerators may be any one of a number of these elements known in the art. Similarly, ROM 903 and BIOS 905 may be any one of a number of ROM and BIOS known in the art, and system memory 904 may be any one of a number of volatile storage known in the art.

Additionally, computing platform 900 may include persistent storage devices 906. Example of persistent storage devices 906 may include, but are not limited to, flash drives, hard drives, compact disc read-only memory (CD-ROM) and so forth. Further, computing platform 900 may include one or more input/output (I/O) interfaces 908 to interface with one or more I/O devices, such as sensors 920. Other example I/O devices may include, but are not limited to, display, keyboard, cursor control and so forth. Computing platform 900 may also include one or more communication interfaces 910 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 911, which may represent one or more buses. In the case of multiple buses, they may be bridged by one or more bus bridges (not shown).

Each of these elements may perform its conventional functions known in the art. In particular, ROM 903 may include BIOS 905 having a boot loader. System memory 904 and mass storage devices 906 may be employed to store a working copy and a permanent copy of the programming instructions implementing the operations associated with hypervisor 912, service/user OS of service/user VM 922-928, and components of NSIS technology 120 (such as controller 326, and so forth), collectively referred to as computational logic 922. The various elements may be implemented by assembler instructions supported by processor core(s) of SoCs 902 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 10 illustrates a storage medium having instructions for practicing methods described with references to FIGS. 1-6, according to various embodiments. The computer-readable non-transitory storage medium that may be suitable for use to store instructions that cause an apparatus, in response to execution of the instructions by the apparatus, to practice selected aspects of the present disclosure. As shown, non-transitory computer-readable storage medium 1002 may include a number of programming instructions 1004. Programming instructions 1004 may be configured to enable a device, e.g., computing platform 900, in response to execution of the programming instructions, to implement (aspects of) hypervisor 812, service/user OS of service/user VM 822-828, and components of NSIS 820 (such as controller 326, and so forth.) In alternate embodiments, programming instructions 1004 may be disposed on multiple computer-readable non-transitory storage media 1002 instead. In still other embodiments, programming instructions 1004 may be disposed on computer-readable transitory storage media 1002, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Examples

Examples, according to various embodiments, may include the following.

Example 1 is an apparatus for computer-assisted or autonomous driving (CA/AD), comprising: a transceiver to broadcast navigation signals; a controller coupled with the transceiver to control operation of the transceiver; wherein the apparatus is fixedly coupled to a location on a roadway or proximate to the roadway; and wherein the controller is to control the transceiver to broadcast the navigation signals to indicate to CA/AD vehicles passing the location, a condition of one or more features at the location of the roadway, to assist respective CA/AD systems in the CA/AD vehicles in assisting or autonomous driving the CA/AD vehicles.

Example 2 may include the apparatus of example 1, wherein the controller is to control the transceiver to broadcast the navigation signals to indicate to the CA/AD vehicles passing the location, the condition of the one or more features at the location of the roadway, to assist the respective CA/AD systems in the CA/AD vehicles in assisting or autonomous driving the CA/AD vehicles in a CA/AD vehicle exclusive lane.

Example 3 may include the apparatus of example 1, wherein the controller is to control the transceiver to broadcast the navigation signals to indicate to the CA/AD vehicles passing the location, the condition of the one or more features at the location of the roadway, to assist the respective CA/AD systems in the CA/AD vehicles in assisting or autonomous driving the CA/AD vehicles to enter an on ramp onto the roadway, or to enter an off ramp to leave the roadway.

Example 4 may include the apparatus of example 1, wherein fixedly coupled to a location on the roadway or proximate to the roadway includes fixedly coupled at a selected one of: a pavement of the roadway, a lane divider of the roadway, a barrier in the roadway or a barrier proximate to the roadway.

Example 5 may include the apparatus of example 1, wherein fixedly coupled to a location on the roadway or proximate to the roadway includes fixedly coupled at a selected one of: on an exit ramp leading away from the road, on an entrance ramp leading to the road, or on a structure above the roadway.

Example 6 may include the apparatus of example 1, wherein the location on the road or proximate to the road is known within 2 millimeters.

Example 7 may include the apparatus of any one of examples 1-6, further comprising: a sensor coupled with the controller to sense and generate sensor data about the condition of the one or more features at the location of the roadway; wherein the controller controls the broadcasting of the transceiver, based at least in part on the sensor data.

Example 8 may include the apparatus of example 7, wherein the sensor includes a camera to indicate traffic density or weather, or a thermometer to identify ambient or roadway temperature.

Example 9 may include the apparatus of any one of examples 1-6, wherein the transceiver is arranged to broadcast the navigation signals in a selected one of: infrared signals, ultrasonic signals, or radio signals.

Example 10 may include the apparatus of any one of examples 1-6, wherein the transceiver is further arranged to receive, from one or more external sources, data associated with the condition of the one or more features of the location of the roadway, and provide the received data to the controller, and wherein the controller is to further to control the broadcasting of the transceiver based at least in part on the data received from the one or more external sources Example 11 is a computer-assisted or autonomous driving (CA/AD) system, comprising: a communication interface disposed in the CA/AD vehicle; a controller coupled to the communication interface, and disposed in the CA/AD vehicle to: receive, via the communication interface, a plurality of indications of a condition of one or more features of a plurality of locations of a roadway, respectively, encoded in a plurality of navigation signals broadcast by a plurality of transmitters fixedly disposed at the plurality of locations, when the CA/AD vehicle drives past the plurality of locations enroute to a destination; determine, based in part on the received indications, adjustments to be made to the driving of the CA/AD vehicle; and send, via the communication interface, indications of the driving adjustments to driving control units (DCU) of the CA/AD vehicle.

Example 12 may include the CA/AD system of example 11, wherein an indication of a condition of one or more features of a plurality of locations of a roadway includes a CA/AD vehicle exclusive lane in the roadway.

Example 13 may include the CA/AD system of example 11, wherein determine adjustments to be made includes determine adjustments to enter or to leave the CA/AD vehicle exclusive lane in the roadway.

Example 14 may include the CA/AD system of example 12, wherein to determine adjustments to be made includes to determine adjustments to remain in the CA/AD vehicle exclusive lane in the roadway.

Example 15 may include the CA/AD system of example 14, wherein the controller further includes to communicate with another CA/AD vehicle in the CA/AD vehicle exclusive lane in the roadway to increase the efficiency of travel for the CA/AD vehicle in the CA/AD vehicle exclusive lane.

Example 16 may include the CA/AD system of example 14, wherein to increase the efficiency of travel for the CA/AD vehicle includes a selected one of: increase the speed of the CA/AD vehicle, or decrease the distance between the CA/AD vehicle and another CA/AD vehicle ahead of or behind the CA/AD vehicle.

Example 17 may include the CA/AD system of example 11, wherein an indication of a condition of one or more features of a plurality of locations of a roadway includes an exit ramp leading away from the roadway.

Example 18 may include the CA/AD system of example 17, wherein the adjustments to be made include adjustments to navigate the CA/AD vehicle from the roadway to the exit ramp.

Example 19 may include the CA/AD system of example 11, wherein an indication of a condition of one or more features of a plurality of locations of a roadway includes an entrance ramp leading toward the roadway.

Example 20 is a method, comprising: receiving a plurality of indications of a condition of one or more features of a plurality of locations of a roadway, respectively, encoded in a plurality of navigation signals broadcast by a plurality of transmitters fixedly disposed at the plurality of locations, when a computer-assisted or autonomous driving (CA/AD) vehicle drives past the plurality of locations enroute to a destination; determining, based in part on the received indications, adjustments to be made to the driving of the CA/AD vehicle; and sending indications of the driving adjustments to a driving control unit (DCU) of the CA/AD vehicle.

Example 21 may be the method of example 20, wherein determining adjustments to be made to the driving of the CA/AD vehicle comprises determining adjustments to enter or to leave a CA/AD vehicle exclusive lane in a roadway.

Example 22 may be the method of claim 20, wherein determining adjustments to be made to the driving of the CA/AD vehicle comprises determining adjustments to navigate the CA/AD vehicle from a roadway onto an exit ramp.

Example 23 may be the method of claim 20, wherein determining adjustments to be made to the driving of the CA/AD vehicle comprises determining adjustments to remain in a CA/AD vehicle exclusive line in a roadway.

Example 24 may be the method of claim 20, wherein receiving a plurality of indications includes receiving an indication of a video image captured by a device coupled with a transmitter.

Example 25 may be the method of any one of examples 20-24, wherein the plurality of transmitters are fixed respectively to a plurality of surfaces of a roadway.

What is claimed is:

1. At least one non-transitory machine-readable storage medium comprising instructions, which when executed by processor circuitry of a road side unit (RSU), cause the processor circuitry to:
   obtain data from a camera of the RSU, the data relating to a traffic-related condition occurring on a roadway that is used by a computer-assisted or autonomous driving vehicle;
   identify, based on the data relating to the traffic-related condition occurring on the roadway, the traffic-related condition occurring on the roadway using one or more neural networks;
   determine, based on an output of the one or more neural networks, safety information for use of the roadway; and
   broadcast a navigation signal to the vehicle, the navigation signal indicating the safety information to enable a driving adjustment at the vehicle to use the roadway based on the traffic-related condition.

2. The machine-readable storage medium of claim 1, wherein the data is image data, and wherein the instructions further cause the processor circuitry to:
   obtain, from the camera, the image data of the traffic-related condition occurring on the roadway;
   wherein the traffic-related condition occurring on the roadway is determined from the image data.

3. The machine-readable storage medium of claim 1, wherein the traffic-related condition occurring on the roadway relates to: an on-ramp to enter the roadway, or an off-ramp to leave the roadway.

4. The machine-readable storage medium of claim 3, wherein the RSU is fixed at a location proximate to the on-ramp to enter the roadway or the off-ramp to leave the roadway.

5. The machine-readable storage medium of claim 1, wherein the RSU is located at an elevated position proximate to or above the roadway.

6. The machine-readable storage medium of claim 1, wherein the RSU is configured to broadcast the navigation signal using radio signals to the vehicle and a plurality of other vehicles using the roadway.

7. A road side unit (RSU), comprising:
   a camera;
   communications circuitry configured to communicate with a computer-assisted or autonomous driving vehicle; and
   processor circuitry configured to:
   obtain data from the camera, the data relating to a traffic-related condition occurring on a roadway that is used by the vehicle;
   identify, based on the data relating to the traffic-related condition occurring on the roadway, a traffic-related condition occurring on the roadway using one or more neural networks;
   determine, based on an output of the one or more neural networks, safety information for use of the roadway; and
   cause the communications circuitry to broadcast a navigation signal to the vehicle, the navigation signal indicating the safety information to enable a driving adjustment at the vehicle to use the roadway.

8. The RSU of claim 7, wherein the data is image data, and
   wherein the processor circuitry is further configured to:
   obtain, from the camera, the image data of the traffic-related condition occurring on the roadway;
   wherein the traffic-related condition occurring on the roadway is determined from the image data.

9. The RSU of claim 7, wherein the traffic-related condition occurring on the roadway relates to: an on-ramp to enter the roadway, or an off-ramp to leave the roadway.

10. The RSU of claim 9, wherein the RSU is fixed at a location proximate to the on-ramp to enter the roadway or the off-ramp to leave the roadway.

11. The RSU of claim 7, wherein the RSU is located at an elevated position proximate to or above the roadway.

12. The RSU of claim 7, wherein the RSU is configured to broadcast the navigation signal using radio signals to the vehicle and a plurality of other vehicles using the roadway.

13. An apparatus, comprising:
   image capture means for capturing an image of a roadway;

sensor means for obtaining data from the image capture means, the data relating to a traffic-related condition occurring on a roadway used by a computer-assisted or autonomous driving vehicle;

machine learning means for identifying, based on the data relating to the traffic-related condition occurring on the roadway, the traffic-related condition occurring on the roadway;

determination means for determining, based on the identification by the machine learning means, safety information for use of the roadway; and radio communication means for broadcasting a navigation signal to the vehicle, the navigation signal indicating the safety information to enable a driving adjustment at the vehicle to use the roadway.

14. The apparatus of claim 13, wherein the traffic-related condition occurring on the roadway relates to: an on-ramp to enter the roadway, or an off-ramp to leave the roadway.

15. The apparatus of claim 14, wherein the apparatus is fixed at a location proximate to the on-ramp to enter the roadway or the off-ramp to leave the roadway.

\* \* \* \* \*